L. G. MADDY.
DRAFT EQUALIZER.
APPLICATION FILED NOV. 21, 1917.
1,291,580.
Patented Jan. 14, 1919.
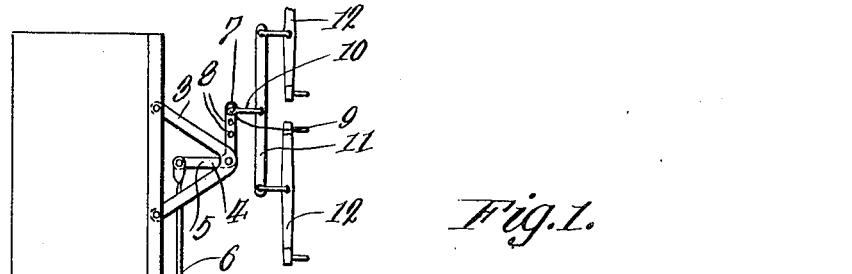
Fig. 1.
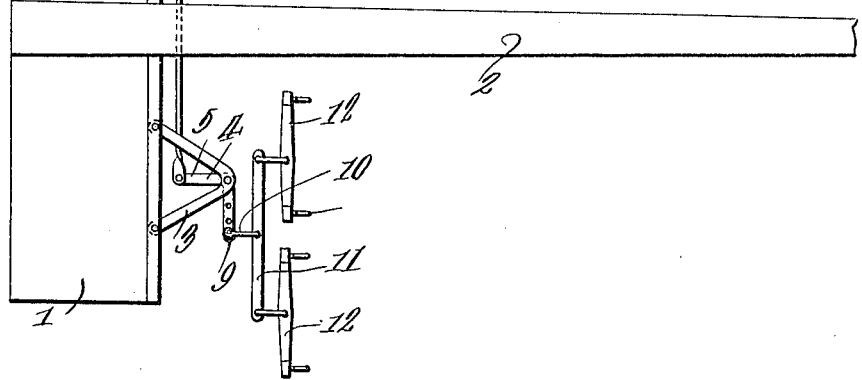
Fig. 2.
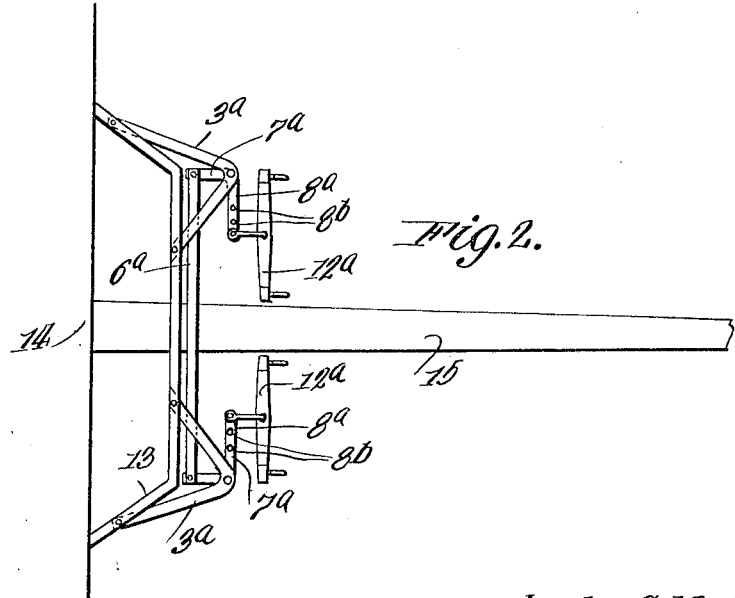
INVENTOR
Lester G. Maddy
WITNESSES
Guy M. Spring
H. H. Babcock,
BY Richard B. Owen.
ATTORNEY

UNITED STATES PATENT OFFICE.

LESTER G. MADDY, OF STOCKTON, KANSAS.

DRAFT-EQUALIZER.

1,291,580.  Specification of Letters Patent.  Patented Jan. 14, 1919.

Application filed November 21, 1917. Serial No. 203,249.

*To all whom it may concern:*

Be it known that I, LESTER G. MADDY, a citizen of the United States, residing at Stockton, in the county of Rooks and State of Kansas, have invented certain new and useful Improvements in Draft-Equalizers, of which the following is a specification.

This invention relates to draft equalizers. One of the main objects of the invention is to provide a draft equalizer of simple construction and operation which may be readily applied. A further object is to provide an equalizer employing two pivoted levers each having a traction attaching arm and an operating arm, the operating arms being pivotally connected, and means being provided for varying the effective length of the traction attaching arms whereby equilibrium may be established between the leverages exerted by the levers when power is applied to the traction attaching arms thereof. Further objects will appear from the detailed description.

In the drawings:

Figure 1 is a top plan view of a draft equalizer constructed in accordance with my invention as applied to a grain drill, the drill being shown diagrammatically.

Fig. 2 is a similar view of a modified form adapted to be used with a rake.

Referring more particularly to Fig. 1 of the drawings, the grain drill 1 is provided with a tongue 2 at its longitudinal center and projecting forwardly of the same. Adjacent each end of the drill, and equi-distant from the tongue 2, is secured a forwardly projecting V-shaped bracket 3, the vertex of the bracket being directed forwardly. A bell-crank lever 4 is pivotally secured at its angle to the bracket 3 at the vertex thereof, these two levers being oppositely disposed with their inner arms in parallel spaced relation. The inner ends of the inner arms 5 of levers 4 are connected by a rod 6 the ends of which are pivotally secured thereto. The outer arm 7 of each lever is provided with a longitudinal series of spaced apertures which are adapted to receive a pin 9 for securing a clevis 10 to arm 7. This clevis is secured to a double-tree 11 at each end of which is secured a swingle-tree 12. By means of the pin 9 and apertures 8, the double-tree 11 can be adjusted longitudinally of arm 7 of the lever so as to vary the effective length thereof. By this means, the differences between the force exerted on the arms 7 of the levers 4 may be compensated so as to establish equilibrium between the leverages exerted by the levers when force is applied to the outer arms thereof. This form of device is intended more particularly for use where a four-horse hitch is employed.

In Fig. 2 of the drawings, the V-brackets 3$^a$ are secured on a supporting frame 13 carried by the rake 14. The bell-crank levers 7$^a$ are pivotally secured at their angles to the vertexes of brackets 3$^a$ and have the inner ends of their inner arms pivotally connected by the rod 6$^a$. The forward arms 8$^a$ of the bell-crank levers are directed inwardly or toward the tongue 15, these arms being provided with spaced apertures 8$^b$ for attachment of the swingle-trees 12$^a$ to the same. The operation of this form of equalizer is the same as that illustrated in Fig. 1, the principal difference being that the arms 8$^b$ of the bell-crank levers are directed toward the tongue so as to bring the swingle-trees closely adjacent the same thus permitting a two horse hitch.

What I claim is:

In a draft equalizer, the combination with a frame adapted to be carried by the vehicle, and spaced V-shaped brackets projecting forward from said frame; of a pair of bell-crank levers pivoted at their angles at the vertexes of said brackets with their rear arms substantially parallel and their other arms in normal alinement with each other and provided with a plurality of apertures, a rod pivotally connecting the rear ends of said rear arms, and clevises mounted in certain of said apertures and carrying whiffle-trees, as described.

In testimony whereof I affix my signature in presence of two witnesses.

LESTER G. MADDY.

Witnesses:
H. H. SNYDER,
N. J. COOLBAUGH, Jr.

Copies of this patent may be obtained for five cents each, by addressing the "Commissioner of Patents, Washington, D. C."